(12) United States Patent
Halas et al.

(10) Patent No.: US 6,908,496 B2
(45) Date of Patent: Jun. 21, 2005

(54) METHOD FOR SCALABLE PRODUCTION OF NANOSHELLS USING SALT ASSISTED PURIFICATION OF INTERMEDIATE COLLOID-SEEDED NANOPARTICLES

(75) Inventors: Nancy J. Halas, Houston, TX (US); Robert Kelley Bradley, Houston, TX (US)

(73) Assignee: William Marsh Rice University, Houston, TX (US)

(*) Notice: Subject to any disclaimer, the term of this patent is extended or adjusted under 35 U.S.C. 154(b) by 95 days.

(21) Appl. No.: 10/335,993

(22) Filed: Jan. 2, 2003

(65) Prior Publication Data

US 2003/0164064 A1 Sep. 4, 2003

Related U.S. Application Data

(60) Provisional application No. 60/345,714, filed on Jan. 2, 2002.

(51) Int. Cl.[7] ............................................. B01D 61/14
(52) U.S. Cl. ......................... 75/370; 75/371; 210/639; 210/650; 210/651
(58) Field of Search .......................... 75/342, 370, 371; 210/639, 650, 651

(56) References Cited

U.S. PATENT DOCUMENTS

| | | | |
|---|---|---|---|
| 5,160,726 A | 11/1992 | Josephson et al. | 424/9 |
| 5,374,356 A | 12/1994 | Miller et al. | 210/641 |
| 5,437,790 A | 8/1995 | Fyson et al. | 210/710 |
| 5,876,480 A * | 3/1999 | Markowitz et al. | 75/252 |
| 5,948,441 A | 9/1999 | Lenk et al. | 424/489 |
| 6,140,040 A | 10/2000 | Palm et al. | 435/2 |
| 6,242,264 B1 * | 6/2001 | Natan et al. | 436/171 |
| 2002/0132045 A1 * | 9/2002 | Halas et al. | 427/217 |
| 2003/0155250 A1 * | 8/2003 | Middeke et al. | 205/163 |

OTHER PUBLICATIONS

Merriam–Webster's Collegiate Dictionary, Tenth Edition, p. 1032, Merriam–Webster Incorporated, 1999.*

John C. Crocker; *Measurement of the Hydrodynamic Corrections to the Brownian Motion of Two Colloidal Spheres*; J. Chem. Phys. 106(7) Feb. 15, 1997; (pp. 2837–2840).

* cited by examiner

*Primary Examiner*—George Wyszomierski
(74) *Attorney, Agent, or Firm*—Conley Rose, P.C.

(57) ABSTRACT

A method for purifying a suspension containing colloid-seeded nanoparticles and excess colloids is provided that includes adding to the suspension a filter aid comprising a salt. The method further includes filtering the suspension with a filter of a pore size intermediate between the average colloid-seeded nanoparticle size and the average excess colloid size, so as to form a retentate that includes the majority of the colloid-seeded nanoparticles and a filtrate that includes the majority of the excess colloids. Still further, the method includes collecting the retentate. The method may be incorporated into a method of making metallized nanoparticles, such as nanoshells, by reduction of metal ions onto the purified colloid-seed nanoparticles so as to form the metallized nanoparticles.

31 Claims, 5 Drawing Sheets

METHOD FOR SCALABLE PRODUCTION OF NANOSHELLS USING SALT ASSISTED PURIFICATION OF INTERMEDIATE COLLOID-SEEDED NANOPARTICLES

CROSS-REFERENCE TO RELATED APPLICATIONS

This application claims the benefit of provisional application Ser. No. 60/345,714, filed Jan. 2, 2002, entitled "Method for Large Scale Production of Nanoshells Using Salt-Assisted Purification of Intermediate Colloid-Seeded Nanoparticles", hereby incorporated herein by reference.

STATEMENT REGARDING FEDERALLY SPONSORED RESEARCH OR DEVELOPMENT

This work was supported by funding from the Army Grant Number DAAD 19-99-1-0315.

FIELD OF THE INVENTION

The present invention relates generally to a method for scalable production of metallized nanoparticles, such as metal nanoshells. More particularly, the present invention relates to a method that uses salt-assisted filtration to separate excess metal colloid from intermediate colloid-seeded nanoparticles so as to purify the colloid-seeded nanoparticles.

BACKGROUND OF THE INVENTION

Particles able to absorb or scatter light of well-defined colors have been used in applications involving detection, absorption, or scattering of light, for example medical diagnostic imaging. Such particles are typically colloidal metal particles. The term colloidal conventionally refers to the size of the particles, generally denoting particles having a size between about 1 nanometer and about 1 micron.

Small particles made from certain metals that are in the size range of colloidal metal particles tend to have a particularly strong interaction with light, termed a resonance, with a maximum at a well-defined wavelength. Such metals include gold, silver, platinum, and, to a lesser extent, others of the transition metals. Light at the resonance wavelength excites particular collective modes of electrons, termed plasma modes, in the metal. Hence the resonance is termed the plasmon resonance.

By selecting the metal material of a colloidal particle, it possible to vary the wavelength of the plasmon resonance. When the plasmon resonance involves the absorption of light, this gives a solution of absorbing particles a well-defined color, since color depends on the wavelength of light that is absorbed. Solid gold colloidal particles have a characteristic absorption with a maximum at 500–530 nanometers, giving a solution of these particles a characteristic red color. The small variation in the wavelength results from a particle size dependence of the plasmon resonance. Alternatively, solid silver colloidal particles have a characteristic absorption with a maximum at 390–420 nanometers, giving a solution of these particles a characteristic yellow color.

Using small particles of various metals, particles can be made that exhibit absorption or scattering of selected characteristic colors across a visible spectrum. However, a solid metal colloidal particle absorbing in the infrared is not known. Optical extinction, in particular absorption or scattering, in the infrared is desirable for imaging methods that operate in the infrared. Further, optical communications, such as long distance phone service that is transmitted over optical fibers, operate in the infrared.

It has been speculated since the 1950's that it would be theoretically possible to shift the plasmon resonance of a metal to longer wavelengths by forming a shell of that metal around a core particle made of a different material. In particular, the full calculation of scattering from a sphere of arbitrary material was solved by Mie, as described in G. Mie, Ann. Phys. 24, 377 (1908). This solution was extended to concentric spheres of different materials, using simplifying assumptions regarding the dielectric properties of the materials, by Aden and Kerker, as described in A. L. Aden and M. Kerker, J. of Applied Physics, 22, 10, 1242 (1951). The wavelength of the plasmon resonance would depend on the ratio of the thickness of the metal shell to the size, such as diameter of a sphere, of the core. In this manner, the plasmon resonance would be geometrically tunable, such as by varying the thickness of the shell layer. A disadvantage of this approach was its reliance on bulk dielectric properties of the materials. Thus, thin metal shells, with a thickness less than the mean free path of electrons in the shell, were not described.

Despite the theoretical speculation, early efforts to confirm tunability of the plasmon resonance were unsuccessful due to the inability to make a particle having a metal shell on a dielectric core with sufficient precision so as to have well-defined geometrical properties. In these earlier methods, it was difficult to achieve one or both of monodispersity of the dielectric core and a well-defined controllable thickness of a metal shell, both desirable properties for tuning the plasmon resonance. Thus, attempts to produce particles having a plasmon resonance in keeping with theoretical predictions tended to result instead in solutions of those particles having broad, ill-defined absorption spectra. In many instances this was because the methods of making the particles failed to produce smooth uniform metal shells. Rather, the methods tended to produce isotropic, non-uniform shells, for example shells having a bumpy surface.

However, one of the present inventors co-developed a novel method of making metallized nanoparticles (particles with a size between about 1 nanometer and about 5 microns) that was successful in producing metal-coated particles having narrow well-defined spectra. Further, one of the present inventors co-discovered that improved agreement with theoretical modeling of the metallized nanoparticles resulted from the incorporation in the theory of a non-bulk, size-dependent value of the electron mean free path. That is, improved agreement with theory was achieved by developing an improved theory applicable to thin metallization layers. Thus, in the improved theory a dependence of the width of the plasmon resonance on the thickness of the metallization layer was described.

Particles having at least one substantially uniform metallization layer have been termed metal nanoshells. Nanoshell structures that exhibit structural tunability of optical resonance's from the visible into the infrared can currently be fabricated. For example, complete nanoparticle metallization shell layers containing gold have been demonstrated. Gold has the advantage of a strong plasmon resonance that can be tuned by varying the thickness of the coating. More generally, the resonance may be tuned by varying either the core thickness or the thickness of the coating, in turn affecting the ratio of the thickness of the coating to the thickness of the core. This ratio determines the wavelength of the plasmon resonance. A further advantage of gold-coated particles is that they have shown promise as materials with advantages in imaging and diagnostics. In particular, they have utility as band-pass optical filters, impeding the photo-oxidation of conjugated polymers, and in conjunction with sensing devices based on surface enhanced Raman substrates.

Present methods for making nanoshells involve purifying suspensions of various intermediates, as well as purifying a suspension of the nanoshell products. Methods of making nanoshells are disclosed, for example, in U.S. Pat. No. 6,344,272 and in S. Oldenburg, R. D. Averitt, S. Westcott, and N. J. Halas, "Nanoengineering of Optical Resonances", *Chemical Physics Letters* 288, 243–247 (1998), each hereby incorporated herein by reference. In particular, a method for making nanoshells may include coating linkers onto substrate particles so as to form linker-coated nanoparticles, seeding metal colloids onto the linkers so as to form colloid-seeded nanoparticles, and reducing metal onto the metal colloids so as to form nanoshells. Further, at various stages, the method includes purification of linker-coated nanoparticle suspensions, purification of colloid-seeded nanoparticle suspensions, and purification of nanoshell suspensions. Corresponding undesirable byproducts correspondingly include, for example, excess linkers, excess metal colloids, and excess metal ions, respectively.

Present methods for purifying nanoshells and intermediates thereof rely on a technique for purifying product or intermediate thereof that involves centrifugation and redispersal. The centrifugation and redispersal may be repeated a suitable number of times to achieve the desired level of purity. A disadvantage of this conventional laboratory method is that it is difficult to scale up to commercial scale. Thus, a scalable method of purifying nanoshells and intermediates thereof is desirable.

Replacement of combined centrifugation and redispersal with filtration is known to those skilled in the art of purification. Filtration has the advantage that it is known to be a scalable method of purification, in particular filtration may be scaled up to commercial scale. However, previous laboratory scale attempts to use filtration to separate excess colloid from colloid-seeded nanoparticles serving as intermediates in making nanoshells have been unsuccessful. This lack of success occurred despite the typical size disparity between excess metal colloid, typically between about 1 nm and 5 nm, and colloid-seeded nanoparticles, typically between 50 nm and 5 $\mu$m. In particular, attempts by the present inventors to crossflow filter a suspension, as it results from the seeding reaction, of colloid-seeded nanoparticles and excess metal colloid using a filter having a 50 nm nominal pore size have demonstrated ineffective passage of the excess colloids through the filter in the filtrate. Rather, sufficient excess colloids were found to remain in the retentate with the colloid-seeded nanoparticles that subsequent reduction of metal so as to form metal nanoshells was unsuccessful.

Thus, notwithstanding the above-described teachings, there remains a need for a scalable method of making nanoshells, particularly when the method involves intermediate colloid-seeded nanoparticles.

SUMMARY OF THE INVENTION

According to a preferred embodiment, the present invention features a method for purifying a suspension containing colloid-seeded nanoparticles and excess colloids that includes adding to the suspension a filter aid comprising a salt. The method further includes filtering the suspension with a filter of a pore size intermediate between the average colloid-seeded nanoparticle size and the average excess colloid size, so as to form a retentate that includes the majority of the colloid-seeded nanoparticles and a filtrate that includes the majority of the excess colloids. Still further, the method includes collecting the retentate. The salt is preferably sodium chloride.

According to an alternative preferred embodiment, the present invention features a method for making metallized nanoparticles that includes providing a suspension of colloid-seeded particles, where the colloids comprise a first metal, purifying the suspension according to the above-described embodiment, and reducing ions of a second metal onto the colloid-seeded particles so as to form the metallized particles. The first metal may be any suitable metal from which small colloids may be made. The first metal is preferably gold. The second metal may be any suitable metal for reduction. The second metal is preferably selected from among gold, silver, copper, nickel, iron, palladium, and platinum.

According to any one of the above-described embodiments the present invention preferably includes reduction of any tendency of the presence of salt to impede reduction of metal onto the colloids forming the colloid-seeded nanoparticles. Such a tendency may occur when the colloid-seeded particles include free linkers remaining from providing the colloid-seeded particles by binding metal colloids to linkers coated on nanoparticles.

Thus, in one embodiment of the present invention, a method of purifying a colloid-seeded nanoparticle includes following salt-assisted filtration, with aqueous filtration to remove salt, adding a protectant so as to passivate free linkers, and aqueous filtration to remove excess protectant. 1-ethyl-3-(3-dimethylaminopropyl)carbodiimide hydrochloride (EDC) is a preferred protectant. This embodiment has the advantage that passivated colloid-seeded nanoparticles tend to be robust precursors for subsequent metal reduction.

Further, in another embodiment of the present invention, a method of purifying a colloid-seeded nanoparticle includes filtering using a wash solution that includes a surfactant as well as the salt. Polyethylene glycol is a preferred surfactant. This embodiment has the advantage that the colloid-seeded nanoparticles suspending in the salt-surfactant solution tend to be robust precursors for subsequent metal reduction. Further, this embodiment has the advantage that the colloid-seeded particles may remain in the salt-surfactant solution for subsequent metal reduction without further filtering.

Thus, the present invention comprises a combination of features and advantages which enable it to overcome various problems of prior methods. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
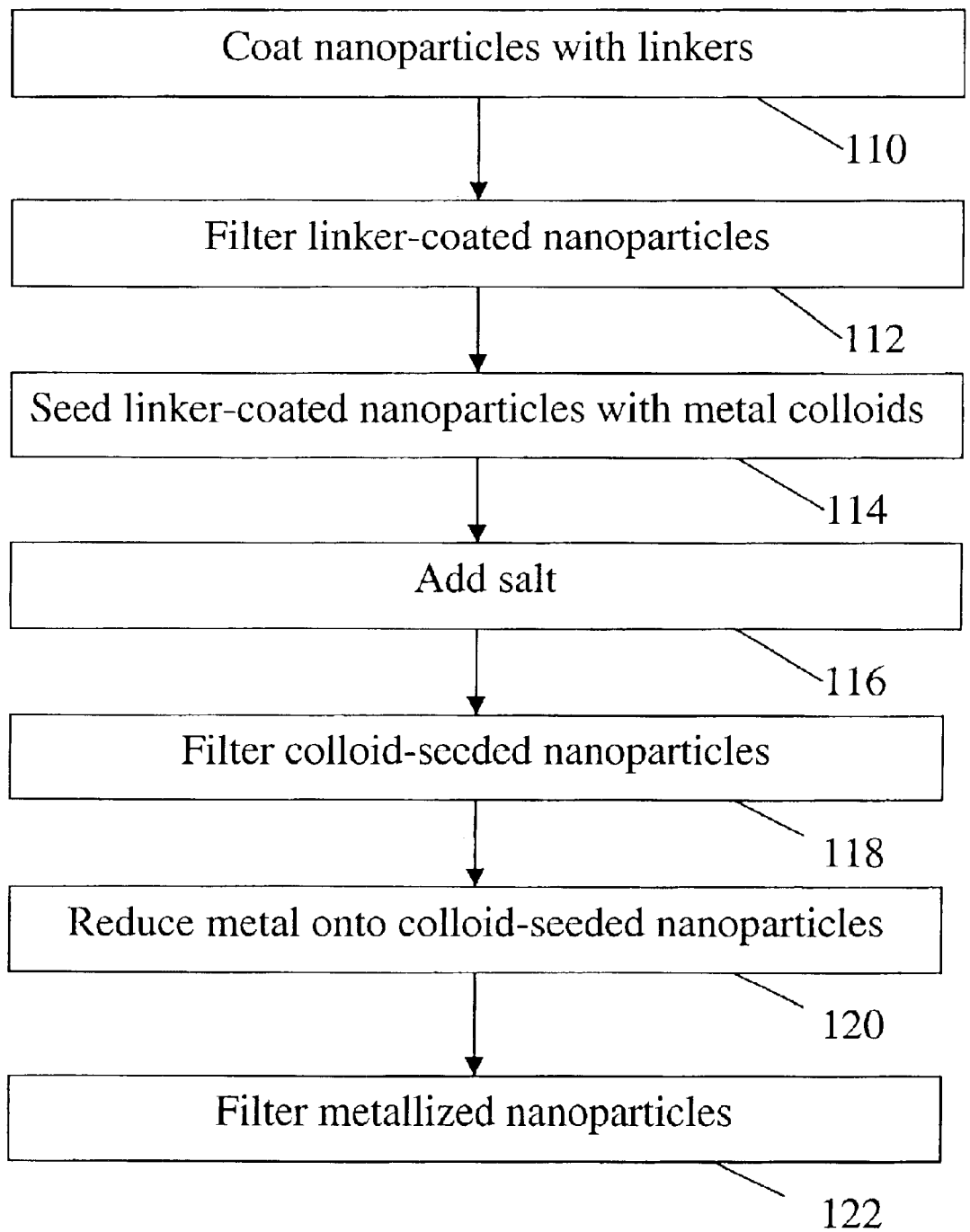
FIG. 1 is a flow diagram of a method for making metallized nanoparticles according to an embodiment of the present invention.

Referring initially to FIG. 1, according to a preferred embodiment of the present invention, a method of making metallized nanoparticles includes coating 110 nanoparticles with linkers, filtering 112 the resulting linker-coated nanoparticles, seeding 114 linker-coated nanoparticles with metal colloids, adding 116 salt to the colloid-seeded nanoparticles, filtering 118 the colloid-seeded nanoparticles, reducing 120 metal onto the colloid-seeded nanoparticles, and filtering 122 the resulting metallized particles. The filter preferably is of a pore size intermediate between the average colloid-seeded nanoparticle size and the average excess colloid size. Although the inventors do not wish to be limited by this interpretation, it is believed that the addition of salt has the advantage of reducing the hydrodynamic radius of the excess colloids such that they are able to pass through the pores in the filter.

The salt is preferably sodium chloride. Preferably salt is added to a suspension of colloid-seeded nanoparticles and excess colloids to give a salt concentration of between about 25 mM and 75 mM.

The filtration is preferably crossflow filtration. Crossflow filtration conventionally includes a plurality of inner membranes contained within an outer wall. The inner membranes are preferably tubular, as is the outer wall. The inner membranes are preferably arranged in a bundle within the outer wall. The inner membranes include pores in their sides. Liquid contained between the outer wall and the inner membranes is maintained at a different pressure than liquid within the membranes. Thus there is a pressure differential across the pores. The suspension to be separated is fed into adjacent ends of the inner membranes. A pump propels the suspension into the ends. As the suspension flows through the inner tubular members filtrate passes though the pores. A wash solution is pumped through the inner tubular membranes. The ratio of the volume of wash solution to the volume of initial suspension is preferably between about 4 and about 12. The filtrate contains the solvent and byproducts. The retentate passes through the inner membranes to their opposite ends where it is collected. The retentate includes the particles being filtered. When cross-current filtration is used to achieve filtration of nanoshells from solution the retentate includes the nanoshells. Likewise, when cross-current filtration is used to achieve separation of nanoshell intermediates, such as linker-coated nanoparticles or colloid-seeded nanoparticles, the retentate includes the nanoshell intermediate.

Figure 2:
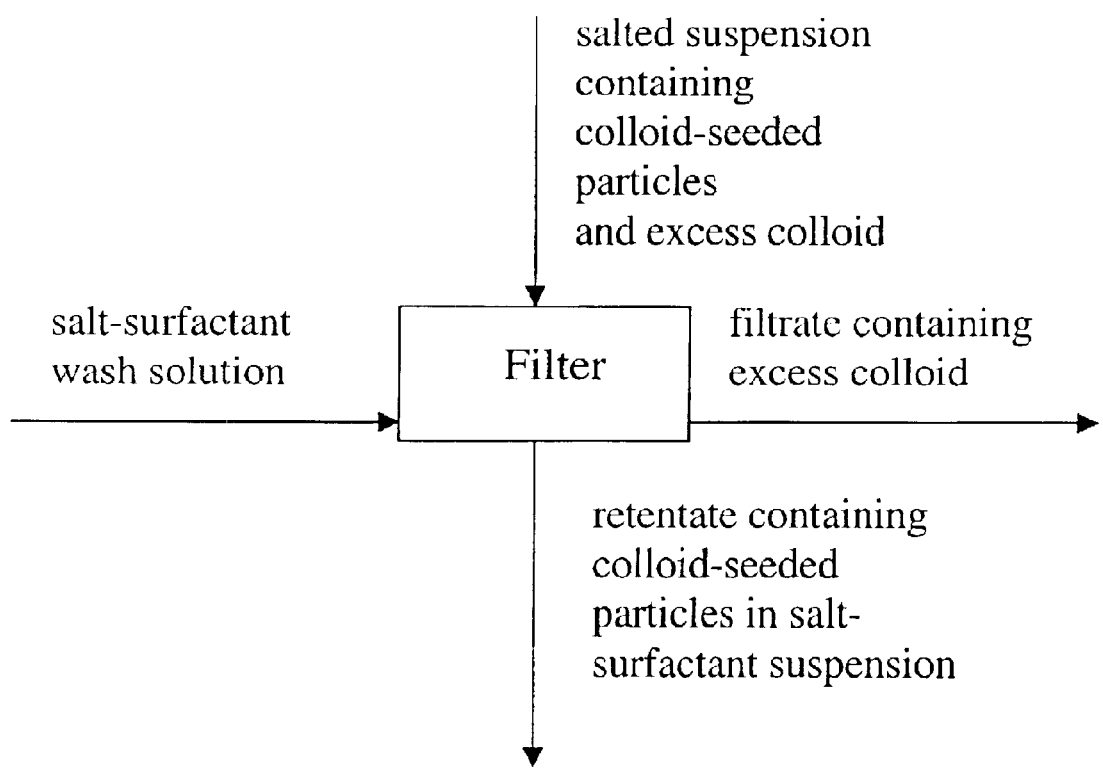
FIG. 2 is a schematic diagram of an embodiment of step 118 of FIG. 1.
Figure 3:
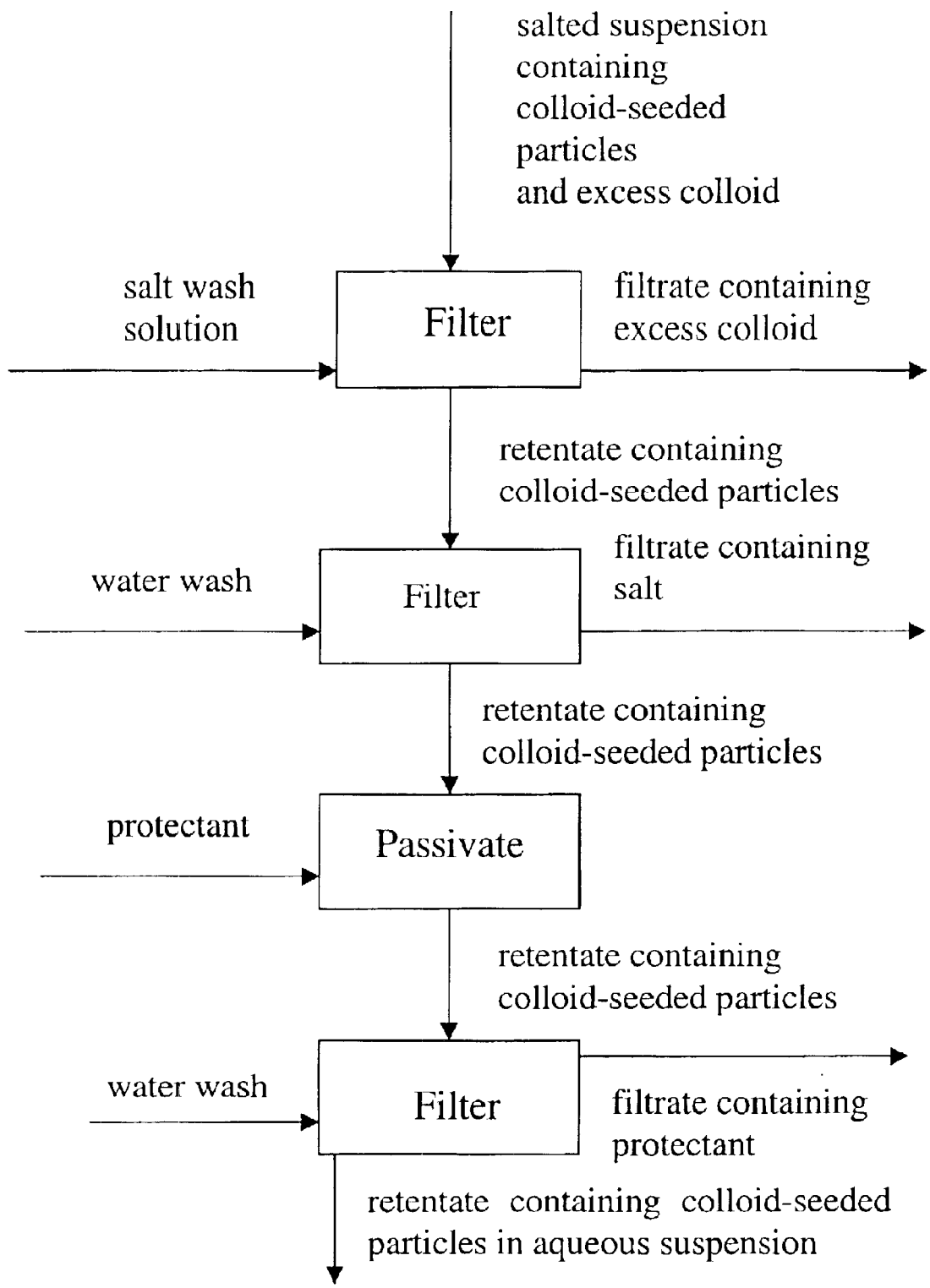
FIG. 3 is schematic diagram of an alternative embodiment of step 118 of FIG. 1.

Referring now to FIGS. 2 and 3, a first method and a second alternative method of filtering a colloid-seeded particle suspension are shown. While the methods are illustrated with respect to step 118 of FIG. 1, it will be understood that the methods are applicable more broadly to salt-assisted filtration of colloid-seeded particles.

Figure 4:
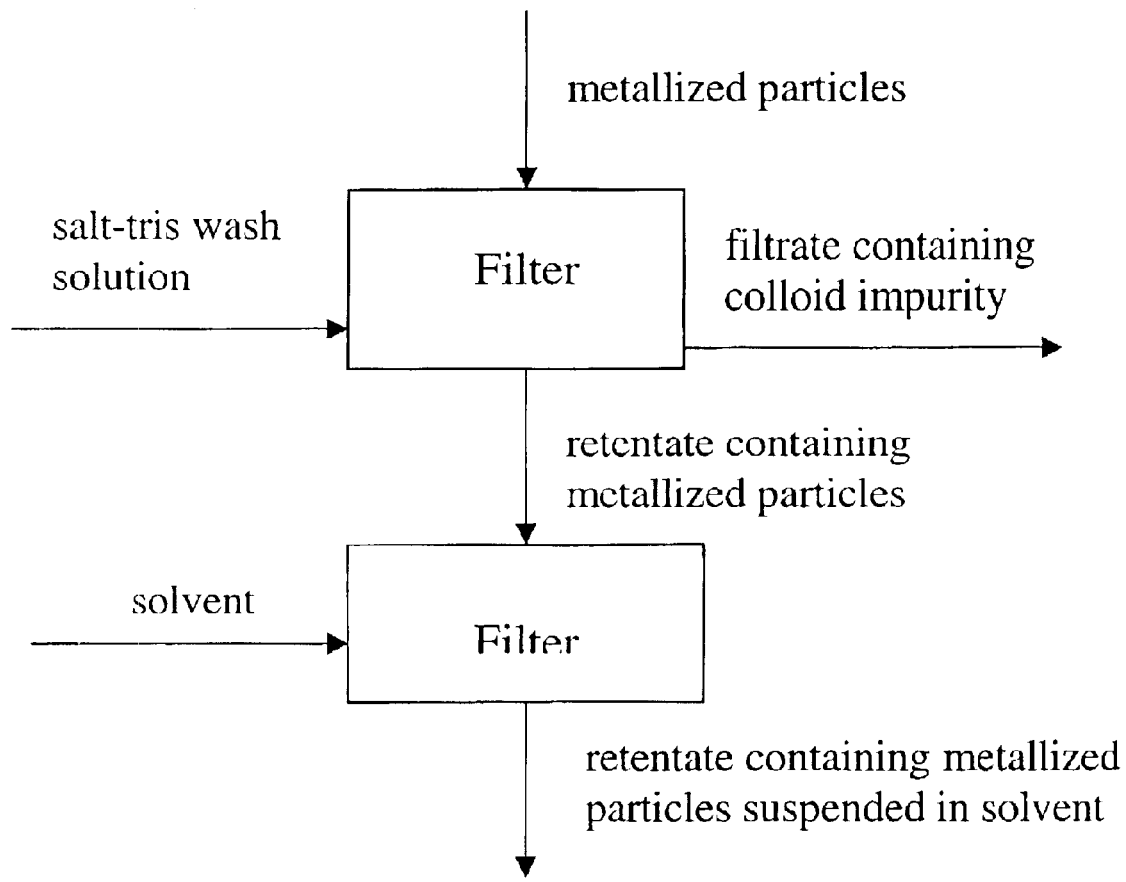
FIG. 4 is a schematic diagram of an embodiment of step 122 of FIG. 1.
Figure 5:
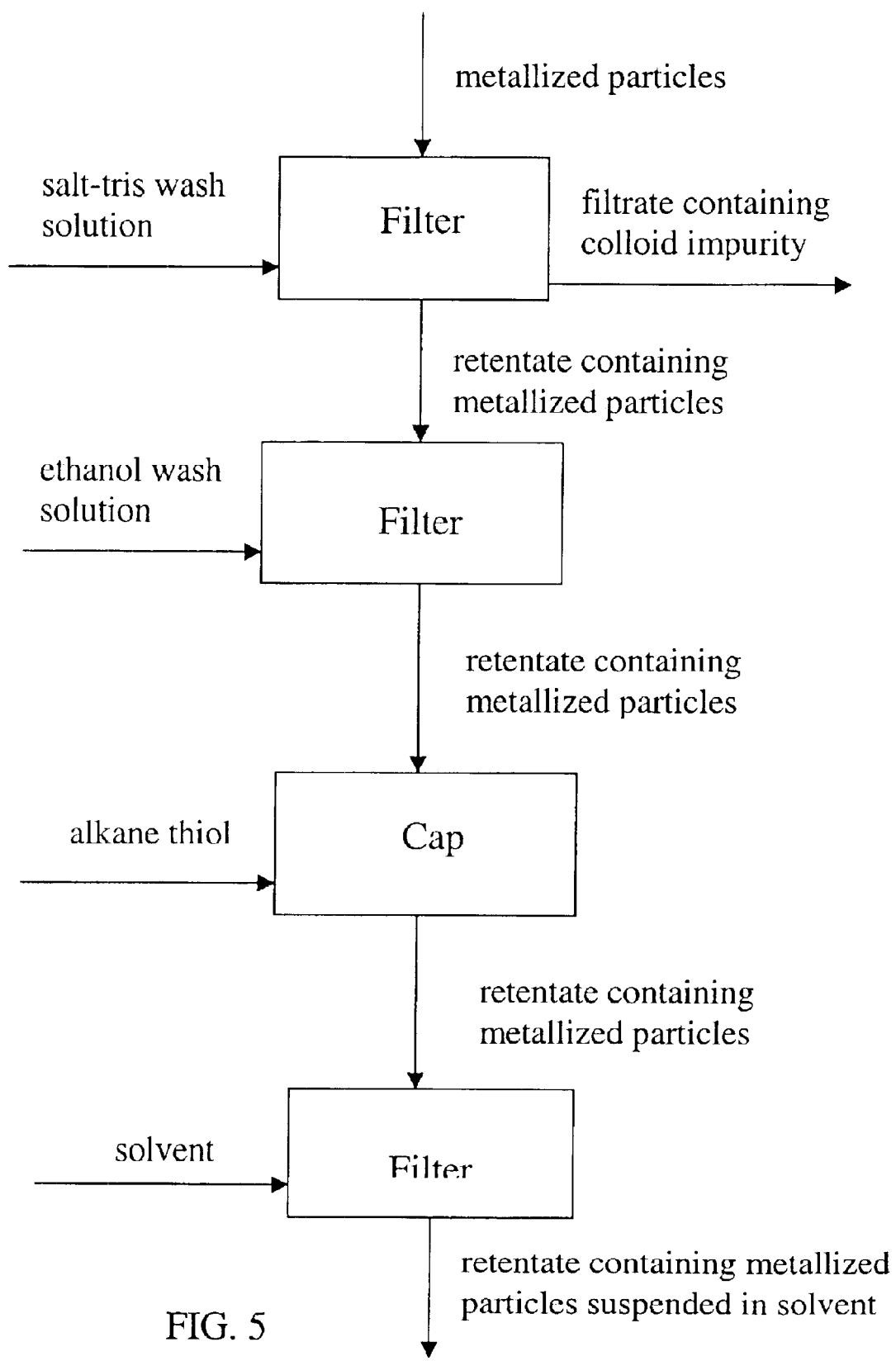
FIG. 5 is a schematic diagram of an alternative embodiment of step 122 of FIG. 1.

Referring now to FIGS. 4 and 5, a first method and a second alternative method of filtering a metallized nanoparticle suspension are shown. While the methods are illustrated with respect to step 122 of FIG. 1, it will be understood that the methods are applicable more broadly to filtration of metallized nanoparticles, particularly metal nanoshells.

In some embodiments, the substrate particles are cores, preferably monodisperse cores. Further, the cores are preferably silica cores. Monodisperse silica cores are preferably grown using the Stöber method, described in Werner Stober, Arthur Fink, and Ernst Bohn, J. Colloid and Interface Science 26, 62–69 (1968), entitled Controlled Growth of Monodisperse Silica Spheres in the Micron Size Range, hereby incorporated herein by reference. According to a preferred embodiment, tetraethylorthosilicate (TEOS), ammonium hydroxide ($NH_4OH$), and water are added to a glass beaker containing ethanol, and the mixture is stirred overnight. The size of the particles that result, herein termed Stöber particles, is dependent on the relative concentrations of the reactants.

According to some embodiments, variations in water, base concentration, and TEOS concentration are used to produce monodisperse silica spheres of various sizes. Temperature and electrolyte concentration also affect the final diameter of the particles. The following concentration ranges are preferred: 0.1 to 0.5 M TEOS, 0.5 to 17 M $H_2O$, and 0.5 to 3.0 M ammonia. Further, a variety of alcohols may be used as solvents. Ethanol is a preferred solvent. Higher ammonia concentrations provide larger particles.

According to an exemplary procedure, uniform particles having a diameter of 120 nm as measured by a transmission electron microscope (TEM) may be prepared by the following method. Approximately 50 milliliters (ml) of dry (100%) ethanol and 4 ml of $NH_4OH$ (25% $NH_3$ in water), is stirred in a glass beaker. To this solution, 2.2 ml of tetraethyl orthosilicate having a purity of at least 99.999% is added and allowed to stir for at least 8 hours. By varying the concentrations of $NH_4OH$, water and silicate among other factors, the size of the silica particle is varied from approximately 20 nm to 500 nm diameter. Larger core particles are grown using a seeded growth technique where additional TEOS and water were added to already formed silica particles. Multiple additions of small amounts of additional reactants allow monodisperse core particles to be grown as large as 5 microns.

The cores are preferably spherical particles between about 1 nanometers to about 5 microns in diameter, more preferably between about 1 nanometers and about 4 microns in diameter. A plurality of cores, for example in solution, is preferably monodisperse. Monodisperse particles are defined herein as particles that have a small variation in the distribution of particle sizes. For spherical particles the size is given by the particle diameter. The small variation is preferably quantified as the standard deviation. In a preferred embodiment, core particles are characterized by a distribution of diameters with a standard deviation of up to about 20%, more preferably about 10%.

It will be understood that variations in the above-described method are contemplated. For example, it will be understood that the substrate particles are not limited to core particles. A substrate particle generally is any particle that includes at least an outer surface of silica or other suitable substrate material. Further, substrate particles may have shapes other than spherical. In particular, although in preferred embodiments the core is spherical in shape, the core may have other shapes such as cubical, cylindrical, hemispherical, elliptical, and the like.

In some embodiments, alternative substrate materials may be used. The substrate material preferably is characterized by a smaller permittivity than the metal that is to be coated on it. Suitable materials include dielectric materials and semiconducting materials. Many dielectric materials are also semiconducting. In particular, suitable substrate materials include silicon dioxide, titanium dioxide, polymethyl methacrylate, polystyrene, gold sulfide cadmium sulfide, cadmium sulfide, gallium arsenide, and the like. Further, suitable substrate materials include dendrimers.

According to a preferred embodiment of the present invention, linkers are coated onto core particles, thus initially functionalizing the core particles for subsequent attachment of metal colloids. When the core particles are silica, aminosilane linkers are preferred. The silane group adsorbs to the silica surface, and the amine group is exposed for further functionalization. Thus, an advantage of the aminosiliane is that it may function as a linker molecule, bridging a silica surface and metal that may be attached to the amine group of the aminosilane. 3-aminopropyltrimethoxysilane (APTMS) is an exemplary silane. APTMS is preferably added to a solution containing silica core particles. Based on estimates, enough silane is preferably added to coat the particles with multiple layers of silane. The solvent for the core particles is preferably ethanol.

According to an exemplary embodiment, 10 ml of a silica particle suspension such as prepared as described above, is added to a 50 ml glass beaker. Next, pure aminopropyltriethoxy silane (APTES) is added to the solution. For example, 40 microliters of undiluted APTES is used for particles having diameters of 120 nm. The solution is stirred for 2 hours, diluted to 200 mls and then heated to a boil for four hours. Although the inventors do not wish to be bound by this interpretation, it is believed that the heating step promotes the reaction of silanol groups into Si—O—Si bonds and strengthens the attachment of the silane to the silica.

In some embodiments, alternative linkers may be used. A linker preferably is attachable to the core and has an atomic site that has an affinity for a metal. The atomic site may be selected from among sulfur, nitrogen, phosphorous, and the like. Further, the linker molecule may include an amino acid that has a terminal group that includes an active atomic site. Still further, when the core includes active hydroxyl groups the linker is preferably a silane that hydrolyzes in water to form hydroxyl groups that are bondable to the active hydroxyl groups on the core. Suitable silanes include APTMS, 3-aminopropyltriethoxysilane, diaminopropyldiethoxy silane, 4-aminobutyldimethylmethoxy silane, mercaptopropyltrimethoxy silane, diphenyltriethoxy silane reacted with tetrahydrothiophene, and the like. Further, the linker molecule may be a non-metallic material, such as CdS and CdSe, and the like.

In some embodiments, a linker may be a molecule cross-linked to another linker molecule. Cross-linking may be achieved, for example, by a thermal or a photo-induced chemical crosslinking process.

According to a preferred embodiment of the present invention, ultrasmall gold colloid (1–3 nm) is synthesized using a solution of $HAuCl_4$, NaOH, and tetrakis (hydroxymethyl)phosphonium chloride (THPC) in water to produce "THPC gold". In an exemplary preparation, gold colloid is synthesized using a solution of 45 mL of water, 1.5 mL of 29.7 mM $HAuCl_4$, 300 uL of 1M NaOH and 1 mL (1.2 mL aqueous solution diluted to 100 mL with water) of tetrakis(hydroxymethyl)phosphonium chloride (THPC).

According to an embodiment of the present invention, the THPC gold colloid thus formed is preferably aged under refrigeration for between about 5 and about 50 days, more preferably for between about 14 and about 40 days.

According to an alternative, preferred, embodiment of the present invention, the THPC gold colloid thus formed is filtered. The filtering preferably occurs from between 0.5 and 2 hours after the solution of $HAuCl_4$, NaOH, and tetrakis(hydroxymethyl)phosphonium chloride (THPC) is mixed. The retentate may be discarded or, alternatively, dissolved for recycling. The filtrate is collected and allowed to undergo further reaction to form additional gold colloid. Preferably the filtrate is maintained at room temperature (about 22° C.) for 1 to 4 days after it is collected, allowing the further reaction to proceed for 1 to 4 days. The gold colloid thus formed is termed filtrate gold. While the inventors do not wish to be bound by this interpretation, it is believed that filtrate gold colloid has a more favorable charge distribution for facilitating nanoshell production, in particular the process of reduction of metal ions from solution onto the gold colloid.

According to still another preferred embodiment of the present invention, gold colloid is then added to linker-coated silica core particles. An aqueous solution of gold colloid is preferably added to an ethanol solution of the silica core particles. The volume ratio of the gold colloid solution to the silica particle solution is preferably between 0.1:1 and 10:1. Exemplary volume ratios for different size cores and a constant sized colloid are given in Table 1, for an exemplary gold colloid concentration of 7.58E+014 and a core concentration of 1.00E+012, where E+n, denotes $10^n$ and leading zeros may be discarded in the exponent n. The combined solution is preferably allowed to react overnight. The gold colloid bonds to the amine-terminated silica particles which provide nucleation sites for the chemical deposition of a metallic shell, forming functionalized core particles. Thus, this completes the functionalization of the core particles, thus forming gold colloid-seeded nanoparticles. It will be understood that the core particle may be any suitable alternative, such as described above, to silica. Further, it is within the skill of one of ordinary skill in the art to select a suitable linker according to the substrate material forming the core particle.

TABLE 1

| Core Dia (nm) | Core Rad(nm) | Surface Area (nm^2) | 30% Area (nm^2) | Gold Col Dia (nm) | Gold Col Rad (nm) | Cross Section (nm^2) | Gold Col/Core | Min Vol (in mL) Gold Col for 1 mL Core |
|---|---|---|---|---|---|---|---|---|
| 50 | 25 | 7.85E+003 | 2.36E+003 | 3 | 1.5 | 7.07E+000 | 3.33E+002 | 4.40E+001 |
| 100 | 50 | 3.14E+004 | 9.42E+003 | 3 | 1.5 | 7.07E+000 | 1.33E+003 | 1.76E+000 |
| 150 | 75 | 7.07E+004 | 2.12E+004 | 3 | 1.5 | 7.07E+000 | 3.00E+003 | 3.96E+000 |
| 200 | 100 | 1.26E+005 | 3.77E+004 | 3 | 1.5 | 7.07E+000 | 5.33E+003 | 7.04E+000 |
| 250 | 125 | 1.96E+005 | 5.89E+004 | 3 | 1.5 | 7.07E+000 | 8.33E+003 | 1.10E+001 |
| 300 | 150 | 2.83E+005 | 8.48E+004 | 3 | 1.5 | 7.07E+000 | 1.20E+004 | 1.58E+001 |
| 350 | 175 | 3.85E+005 | 1.15E+005 | 3 | 1.5 | 7.07E+000 | 1.63E+004 | 2.15E+001 |

TABLE 1-continued

| Core Dia (nm) | Core Rad(nm) | Surface Area (nm^2) | 30% Area (nm^2) | Gold Col Dia (nm) | Gold Col Rad (nm) | Cross Section (nm^2) | Gold Col/Core | Min Vol (in mL) Gold Col for 1 mL Core |
|---|---|---|---|---|---|---|---|---|
| 400 | 200 | 5.03E+005 | 1.51E+005 | 3 | 1.5 | 7.07E+000 | 2.13E+004 | 2.81E+001 |
| 450 | 225 | 6.36E+005 | 1.91E+005 | 3 | 1.5 | 7.07E+000 | 2.70E+004 | 3.56E+001 |
| 500 | 250 | 7.85E+005 | 2.36E+005 | 3 | 1.5 | 7.07E+000 | 3.33E+004 | 4.40E+001 |

According to some embodiments alternative metal colloids may be used in place of gold colloids in attaching to a linker molecules. Alternative metals include silver, platinum, tin, and nickel.

Reduction of shell metal preferably includes included mixing a functionalized dielectric substrate, a plurality of metal ions, and a reducing agent, in solution. Formaldehyde is a preferred reducing agent. In some embodiments, the metal includes at least one element selected from the Periodic Table of the Elements that are commonly known as metals. As used herein, metals include those elements disclosed in the USPTO Manual of Classification as metals. Both the old IUPAC notation, with Roman numerals, and the new notation, with Arabic numbers will be used herein. See, for example Lewis, Richard J., Sr., "Hawley's Condensed Chemical Dictionary" (1997, John Wiley and Sons), the inside front cover page, hereby incorporated herein by reference, for a comparison of notations. In particular, Group I metals include Group 1 metals (Li, Na, K, Rb, Ca, and Fr) and Group 11 metals (Cu, Ag, and Au). Group II metals include Group 2 metals (Be, MG, Ca, Sr, Ba, and Ra) and Group 12 metals (Zn, Cd, and Hg). Group III metals include Group 3 metals (Sc and Y) and Group 13 metals (Al, Ga, In, and Tl). Group IV metals include Group 4 metals (Ti, Zr, and Hf) and Group 14 metals (Ge, Sn, and Pb). Group V metals include Group 5 metals (V, Nb, and Ta) and Group 15 metals (As, Sb, and Bi). Group VI metals include Group 6 metals (Cr, Mo, and W) and Group 16 metals (Po). Group VII metals include Group 7 metals (Mn, To, and Re). Group VIII metals include Group 8 metals (Re, Ru, and Os), Group 9 metals (Co, Rh, and Ir), and Group 10 metals (Ni, Pd, and Pt). A metallic material forming shell 16 preferably is selected from the elements of Groups I and VII. More preferably, the metallic material is selected from among copper (Cu), silver (Ag), gold (Au), nickel (Ni), platinum (Pt), palladium (Pd), and iron (Fe). The metal may include primarily a single element. Alternatively, the metal may be a combination of at least two elements, such as an alloy, for example a binary alloy. Yet alternatively, in some embodiments, the metal is a synthetic metal. A synthetic metal is defined herein as an organic or organometallic material that has at least one characteristic property in common with a metal. For example, the property may be electrical conductivity. Thus, synthetic metals include conducting polymers, such as polyacetylene, polyanaline, and the like. Therefore, suitable metals include any of an elemental metal, an alloy, a synthetic metal, and the like, and combinations thereof.

When the metal is selected from among silver, copper, and nickel, as disclosed in U.S. Utility application Ser. No. 09/966,544, filed Sep. 27, 2001, the method preferably further includes raising the pH of the solution effective to coat the substrate with the metal. In particular, in one embodiment, as disclosed therein, gold-functionalized silica particles are mixed with 0.15 mM solution of fresh silver nitrate and stirred vigorously. A small amount (typically 25–50 micro-liters) of 37% formaldehyde is added to begin the reduction of the silver ions onto the gold particles on the surface of the silica. This step is followed by the addition of doubly distilled ammonium hydroxide (typically 50 micro-liters). The "amounts" or "relative amounts" of gold-functionalized silica and silver nitrate dictate the core to shell ratio and hence the absorbance.

The above-described preferred embodiments may be combined in any suitable combination.

Thus, for example, Applicants have discovered a method for purifying a suspension containing colloid-seeded nanoparticles and excess colloids that includes:

(a) adding to the suspension a filter aid comprising a salt;

(b) filtering the suspension with a filter of a pore size intermediate between the average colloid-seeded nanoparticle size and the average excess colloid size, so as to form a retentate comprising the majority of the colloid-seeded nanoparticles and a filtrate comprising the majority of the excess colloids; and (c) collecting the retentate.

The salt may include sodium chloride. Step (b) may include:

(b1) loading the suspension to a retentate zone, wherein the filter separates the retentate zone from a filtrate zone; and (b2) passing a first wash liquid through the retentate zone. Step (b2) may include passing the first wash liquid tangentially to the filter such that the filtering comprises crossflow filtering. The first wash liquid may include a solution of the salt added in step (a), the solution having a salt concentration about equal to the salt concentration of the suspension after step (a). The first wash liquid may further include a surfactant. The surfactant may be polyethylene glycol. Step (b) may further include:

(b3) passing a second wash liquid through the retentate zone.

The second wash liquid may include water.

Each colloid-seeded nanoparticle may include:

a plurality of linkers; and a plurality of colloids bound to a portion of the linkers, the remaining portion of the linkers being free; and wherein the method further comprises:

(d) adding a plurality of protectants to the retentate so as to passivate the free linkers.

Each linker may include an amine moiety and wherein each protectant comprises 1-ethyl-3-(3-dimethylaminopropyl) carbodiimide hydrochloride (EDC).

Further, Applicants have discovered a method for treating a suspension containing colloid-seeded nanoparticles and excess metal colloids that includes:

(a) adding to the suspension a filter aid comprising a salt;

(b) filtering the suspension with a filter of a pore size intermediate between the average seeded nanoparticle size and the average excess colloid size, so as to form a retentate comprising the majority of the precursors and a filtrate comprising the majority of the excess colloids, wherein the filtering comprises:
  (b1) loading the suspension to a crossflow filtration zone containing the filter; and
  (b2) passing a first wash liquid through the filtration zone tangentially to the filter; and
(c) collecting the retentate.

Each metal colloid may include gold. Each gold colloid may include filtrate gold. The method may further include:
  (d) reducing metal ions onto the seeded nanoparticles so as to form metallized nanoparticles. The metal ions may be selected from the group consisting of gold ions, silver ions, platinum ions, palladium ions, nickel ions, iron ions, and copper ions.

Still further, Applicants have discovered a method for making metallized nanoparticles via intermediate colloid-seeded nanoparticles, where the method includes:
  (a) providing a suspension of the colloid-seeded nanoparticles, wherein the colloids comprise a first metal;
  (b) adding to the suspension a filter aid comprising a salt;
  (c) filtering the suspension with a filter of a pore size intermediate between the average seeded nanoparticle size and the average excess colloid size, so as to form a retentate comprising the majority of the seeded nanoparticles and a filtrate comprising the majority of the excess colloids;
  (d) collecting the retentate; and
  (e) reducing ions of a second metal onto the colloid-seeded nanoparticles so as to form the metallized nanoparticles.

The salt may include sodium chloride. Step (b) may include:
  (b1) loading the suspension to a retentate zone, wherein the filter separates the retentate zone from a filtrate zone; and
  (b2) passing a first wash liquid through the retentate zone. Step (b2) may include passing the first wash liquid tangentially to the filter such that the filtering comprises crossflow filtering. The first wash liquid may include a solution of the salt added in step (a), the solution having a salt concentration about equal to the salt concentration of the suspension after step (a). The first wash liquid may further include a surfactant. The surfactant may be polyethylene glycol. Step (b) may further include:
  (b3) passing a second wash liquid through the retentate zone.

The second wash liquid may include water. Step (a) may include mixing a suspension of colloids with a suspension of linker-coated nanoparticles so as to form the suspension of the colloid-seeded nanoparticles. The colloid-seeded nanoparticles may include free linkers and the method may further include:
  (d) adding a plurality of protectants to the retentate so as to passivate the free linkers.

Each linker may include an amine moiety and each protectant comprises 1-ethyl-3-(3-dimethylaminopropyl) carbodiimide hydrochloride (EDC). The second metal may have the same identity as the first metal. The second metal may differ from the first metal. The first metal may include gold. The colloids may include filtrate gold. The second metal may be selected from among gold, silver, platinum, palladium, nickel, iron, and copper.

Without further elaboration, it is believed that one skilled in the art can, using the description herein, utilize the present invention to its fullest extent. The following embodiments are to be construed as illustrative, and not as constraining the scope of the present invention in any way whatsoever.

EXAMPLES

Gold Metallization of Silica Nanoparticles

As a general guide, using any of the following exemplary procedures, 1 mL of silica particles will produce about 250 mg of shells (this will vary depending on shell thickness, silica concentration and silica size.)

Example 1

Salt-Assisted Filtration Followed by Passivation of Free Linkers

I) Preparation of 'Filtrate Gold Colloid'
1) Make THPC Gold Colloid by the standard method, such as disclosed in U.S. Pat. No. 6,344,272, and in S. Oldenburg, R. D. Averitt, S. Westcott, and N. J. Halas, "Nanoengineering of Optical Resonances", *Chemical Physics Letters* 288, 243–247 (1998), which each incorporated herein by reference.
2) Concentrate the Gold Colloid solution with the CFF (400 KDa filter) within 1 hour of synthesis and collect the filtrate in a clean vessel (the concentrated gold colloid can be discarded.)
3) Allow the filtrate to age at room temp for 48–72 hours and then use or refrigerate (the filtrate solution will have reacted to form 'filtrate gold colloid'.)

II) Preparation of Seed Solution
1) Make monodisperse APTES functionalized silica particles by a standard method (e.g. Stober synthesis, commercial particles, etc.) such a method as disclosed herein. The silica particles should be about 5 wt % in EtOH—about 1E12 particles/mL for 100–400 nm diameter particles. (Following the original protocol, such as disclosed in U.S. patent application Ser. No. 09/038,377, filed Mar. 11, 1998, and in S. Oldenburg, R. D. Averitt, S. Westcott, and N. J. Halas, "Nanoengineering of Optical Resonances", *Chemical Physics Letters* 288, 243–247 (1998), which each incorporated herein by reference, for shell synthesis will produce silica particles in this concentration range.)
2) Add 100 mL of filtrate gold colloid per 1 mL of silica particles used. (Filtrate gold conc. is about 5E14 colloid/mL as made.)
3) Add 575 mg of NaCl per mL of silica used (This will give a 50 mM salt conc.)
4) Allow the seed solution to stir for 15 min to 1 hour.

III) Diafiltration of Seed Solution
1) Prepare wash solutions:
   A) Salt Solution: 5 L DI water+9 g NaCl (50 mM NaCl)
   B) Water: 5 L DI water
2) Add the seed solution to the CFF vessel (50 nm pore filter)
3) Add Salt solution until the CFF pump is primed
4) Turn on the pump and concentrate the Seed Solution until the total volume in the CFF is approximately 400 mL. (In order to remove all permiate at least 8 times this volume must be diafiltered through the system. So for a 400 mL volume in the CFF, at least 3200 mL of wash solution must be used. Note for larger batches make larger wash solutions based on the 8×factor.)
5) Diafilter the Salt Solution. This will remove all the excess gold colloid from the seed particles. Backflush frequently to make sure a cake does not form on the filter (a filter cake could prevent the gold colloid from passing though the filter.)

6) After the Salt Solution, diafilter with water to remove the salt.
7) Concentrate the volume in the CFF to as little as possible without sucking air into the pump.
8) Open the relief valve and drain the liquid from the CFF into a clean bottle.
9) Most of the seed will have formed a cake on the filter (even with backflushing.) To recover this seed, hook the filtrate outlet line up to the DI water line and backwash by flowing clean DI water backwards through the filter. This will flush the seeds from the filter and allow recovery through the relief valve and into the collection bottle. Try to minimize the amount of DI water used so as not to dilute the seed more than is necessary.
10) Clean the CFF and store it with water inside the filter cartridge.

IV) EDC Treatment
1) Too the seed solution add 125 uL of concentrated acetic acid for each 100 mL of seed solution.
2) Add 125 mg of EDC for each 100 mL of seed solution.
3) The pH should be about 5. If not adjust the pH with HCl or NaOH but do not use any acid or base with an amine or carboxylic acid group.
4) Allow the seed solution to stir for 20 min to 2 hours and then diafilter (see next step)

V) Diafilter EDC/Seed
1) Diafilter the Seed solution to remove excess EDC and acetic acid. Use the same procedure as described above but only filter with the water wash solution.

VI) Seed Dilution
1) The seed should be diluted to a concentration of approximately 1E9 particles/mL VII) Shell Growth
1) Grow shells in the standard way (i.e. use sweeps to find the proper ratio of Kcarb to seed and then scale up to a large batch—use formaldehyde as the reducing agent.)

VIII) Diafiltration of Shells
1) Follow the same procedure as in diafiltration of seed solution above except substitute the following wash solutions:
A) 5 L DI, 9 g NaCl, 30 g tris(hydroxymethyl) aminomethane (to remove any gold colloid that may have formed during shell growth. If no gold colloid is present just filter with solution B.)
B) One of the following depending on the final form the shells should be in:
i) 5 L DI and 30 g tris
ii) 5 L EtOH (if using EtOH backwash with Ethanol not DI H2O)
iii) 5 L DI and appropriate surfactant or PEG (1 mM concentration is usually good)

IIX) Optional Thiol Capping
1) Diafilter shells with EtOH as describes above.
2) Add alkane thiol to shells and allow to react overnight. (Amount should be calculated based off of number of shells and shell surface area. Using excess is ok.)
3) Diafilter as describes previously using the solvent that you want the shell to be suspended in.

Example 2

Salt-Assisted Filtration with Salt-Surfactant Wash Solution

I) Follow steps I and II in Example 1.
II) In step III of Example 1 use the following wash solution: 5 L DI, 9 g NaCl and 50 g 10,000 MW PEG (1 mM.) Do not filter with the second wash solution (i.e. The seeds are left in NaCl/PEG solution after diafiltration.)
III) Skip steps IV and V in Example 1
IV) Follow steps VI through IIX in Example 1.

U.S. Provisional application Ser. No. 60/259,757, filed Jan. 4, 2001, entitled "Method for Large Scale Production of Nanoshells", is hereby incorporated herein by reference.

While preferred embodiments of this invention have been shown and described, modifications thereof can be made by one skilled in the art without departing from the spirit or teaching of this invention. The embodiments described herein are exemplary only and are not limiting. Many variations and modifications of the method are possible and are within the scope of the invention. For example, unless indicted otherwise, method steps may be carried out simultaneously or sequentially in any order. Further, unless indicated otherwise method steps may be carried out in any order. Accordingly, the scope of protection is not limited to the embodiments described herein, but is only limited by the claims that follow, the scope of which shall include all equivalents of the subject matter of the claims.

What is claimed is:

1. A method for purifying a suspension containing colloid-seeded nanoparticles and excess colloids, comprising:
   (a) adding to the suspension a filter aid comprising a salt;
   (b) filtering the suspension with a filter of a pore size intermediate between the average colloid-seeded nanoparticle size and the average excess colloid size, so as to form a retentate comprising the majority of the colloid-seeded nanoparticles and a filtrate comprising the majority of the excess colloids, wherein each colloid-seeded nanoparticle comprises a plurality of linkers, and a plurality of colloids bound to a portion of the linkers, the remaining portion of the linkers being free;
   (c) collecting the retentate; and
   (d) adding a plurality of protectants to the retentate so as to passivate the free linkers.

2. The method according to claim 1 wherein step (b) comprises:
   (b1) loading the suspension to a retentate zone, wherein the filter separates the retentate zone from a filtrate zone; and
   (b2) passing a first wash liquid through the retentate zone.

3. The method according to claim 2 wherein step (b2) comprises:
   passing the first wash liquid tangentially to the filter such that the filtering comprises crossflow filtering.

4. The method according to claim 2 wherein the first wash liquid comprises a solution of the salt added in step (a), wherein the solution comprises the salt in a concentration about equal to the salt concentration of the suspension after step (a).

5. The method according to claim 2 wherein the first wash liquid comprises a surfactant.

6. The method according to claim 5 wherein the surfactant comprises polyethylene glycol.

7. The method according to claim 2 wherein step (b) further comprises:
   (b3) passing a second wash liquid through the retentate zone.

8. The method according to claim 7 wherein the second wash liquid comprises water.

9. The method according to claim 1 wherein each linker comprises an amine moiety and wherein each protectant comprises 1-ethyl -3-(3-dimethylaminopropyl)carbodiimide hydrochloride (EDC).

10. The method according to claim 1 wherein the salt comprises sodium chloride.

11. A method for treating a suspension containing colloid-seeded nanoparticles and excess metal colloids comprising:
(a) adding to the suspension a filter aid comprising a salt;
(b) filtering the suspension with a filter of a pore size intermediate between the average seeded nanoparticle size and the average excess colloid size, so as to form a retentate comprising the majority of the colloid-seeded nanoparticles and a filtrate comprising the majority of the excess colloids, wherein each colloid-seeded nanoparticle comprises free linkers, and further wherein the filtering comprises:
(b1) loading the suspension to a crossflow filtration zone containing the filter; and
(b2) passing a first wash liquid through the filtration zone tangentially to the filter;
(c) collecting the retentate; and
(d) adding a plurality of protectants to the retentate so as to passivate the free linkers.

12. The method according to claim 11 further comprising:
(e) reducing metal ions onto the seeded nanoparticles so as to form metallized nanoparticles.

13. The method according to claim 11 wherein each metal colloid comprises gold.

14. The method according to claim 13 wherein the gold comprises filtrate gold.

15. The method according to claim 11 wherein the metal ions are selected from the group consisting of gold ions, silver ions, platinum ions, palladium ions, nickel ions, iron ions, and copper ions.

16. A method for making metallized nanoparticles via intermediate colloid-seeded nanoparticles, comprising:
(a) providing a suspension of the colloid-seeded nanoparticles, wherein the colloids comprise a first metal, and further wherein each colloid-seeded nanoparticle comprises free linkers;
(b) adding to the suspension a filter aid comprising a salt;
(c) filtering the suspension with a filter of a pore size intermediate between the average seeded nanoparticle size and the average excess colloid size, so as to form a retentate comprising the majority of the seeded nanoparticles and a filtrate comprising the majority of the excess colloids;
(d) collecting the retentate and adding a plurality of protectants to the retentate so as to passivate the free linkers; and
(e) reducing ions of a second metal onto the colloid-seeded nanoparticles so as to form the metallized nanoparticles.

17. The method according to claim 16 wherein step (b) comprises:
(b1) loading the suspension to a retentate zone, wherein the filter separates the retentate zone from a filtrate zone; and
(b2) passing a first wash liquid through the retentate zone.

18. The method according to claim 17 wherein step (b2) comprises:
passing the first wash liquid tangentially to the filter such that the filtering comprises crossflow filtering.

19. The method according to claim 17 wherein the first wash liquid comprises a solution of the salt added in step (a), wherein the solution comprises the salt in a concentration about equal to the salt concentration of the suspension after step (a).

20. The method according to claim 17 wherein the first wash liquid comprises a surfactant.

21. The method according to claim 20 wherein the surfactant comprises polyethylene glycol.

22. The method according to claim 17 wherein step (b) further comprises:
(b3) passing a second wash liquid through the retentate zone.

23. The method according to claim 22 wherein the second wash liquid comprises water.

24. The method according to claim 16 wherein step (a) comprises mixing a suspension of colloids with a suspension of linker-coated nanoparticles so as to form the suspension of the colloid-seeded nanoparticles.

25. The method according to claim 16 wherein each linker comprises an amine moiety and each protectant comprises 1-ethyl-3-(3-dimethylaminopropyl)carbodiimide hydrochloride (EDC).

26. The method according to claim 16 wherein the second metal has the same identity as the first metal.

27. The method according to claim 16 wherein the second metal has an identity different from the first metal.

28. The method according to claim 16 wherein the first metal comprises gold.

29. The method according to claim 28 wherein the gold comprises filtrate gold.

30. The method according to claim 16 wherein the second metal is selected from the group consisting of gold, silver, platinum, palladium, nickel, iron, and copper.

31. The method according to claim 16 wherein the salt comprises sodium chloride.

* * * * *